US008416778B2

(12) United States Patent
Fernández Gutiérrez

(10) Patent No.: US 8,416,778 B2
(45) **Date of Patent: *Apr. 9, 2013**

(54) METHOD FOR MANAGING MULTICAST TRAFFIC IN A DATA NETWORK AND NETWORK EQUIPMENT USING SAID METHOD

(75) Inventor: Alvaro Fernández Gutiérrez, Barcelona (ES)

(73) Assignee: Media Patents, S.L. (ES)

(*) Notice: Subject to any disclaimer, the term of this patent is extended or adjusted under 35 U.S.C. 154(b) by 0 days.

This patent is subject to a terminal disclaimer.

(21) Appl. No.: 13/476,688

(22) Filed: May 21, 2012

(65) Prior Publication Data

US 2012/0230332 A1 Sep. 13, 2012

Related U.S. Application Data

(63) Continuation of application No. 12/440,225, filed as application No. PCT/EP2007/011043 on Dec. 17, 2007, now Pat. No. 8,184,630.

(30) Foreign Application Priority Data

Oct. 15, 2007 (ES) .................................. 200702687

(51) Int. Cl.
*H04L 12/28* (2006.01)
*H04L 12/56* (2006.01)

(52) U.S. Cl. ....................................... 370/390; 370/392

(58) Field of Classification Search ........................ None
See application file for complete search history.

(56) References Cited

U.S. PATENT DOCUMENTS

| | | | | |
|---|---|---|---|---|
| 6,553,028 | B1 | 4/2003 | Tang et al. | |
| 7,301,945 | B1 | 11/2007 | Ooms et al. | |
| 7,640,333 | B1 * | 12/2009 | Fernandez Gutierrez | 709/223 |
| 7,680,884 | B2 | 3/2010 | Zhou et al. | |
| 8,102,870 | B2 | 1/2012 | Guo et al. | |
| 2002/0099857 | A1 * | 7/2002 | Lowe et al. | 709/250 |
| 2002/0120769 | A1 | 8/2002 | Ammitzboell | |
| 2003/0079040 | A1 | 4/2003 | Jain et al. | |
| 2004/0158872 | A1 * | 8/2004 | Kobayashi | 725/120 |
| 2005/0111474 | A1 | 5/2005 | Kobayashi | |
| 2005/0157741 | A1 | 7/2005 | Wu et al. | |

(Continued)

OTHER PUBLICATIONS

B. Cain, S. Deering, I. Kouvelas, B. Fenner, A Thyagarajan, "Internet Group Management Protocol, Version 3", RFC 3376, Oct. 2002, entire document.*

*Primary Examiner* — Gregory Sefcheck
*Assistant Examiner* — Suk Jin Kang
(74) *Attorney, Agent, or Firm* — Cantor Colburn LLP

(57) ABSTRACT

The invention relates to a method for managing multicast traffic in a data network, and network equipment using said method. Hosts receive from a network interface of a router traffic sent by sources in a multicast group. The hosts and the router communicate with one another by using a multicast host-router communications protocol by which the hosts send to the router messages to request multicast traffic from sources in a multicast group. The router receiving one of said messages obtains in said message identifying data which identify the host that has sent said message, and said router stores in specific records for each network interface of the router, host and multicast group information about the sources the traffic of which has been requested by said host in said messages sent to the router.

27 Claims, 5 Drawing Sheets

U.S. PATENT DOCUMENTS

2005/0180448 A1 8/2005 Yobayashi
2006/0146857 A1* 7/2006 Naik et al. .................... 370/432
2007/0047545 A1* 3/2007 Bou-Diab et al. ............ 370/390
2007/0086457 A1 4/2007 Rune et al.
2007/0183418 A1 8/2007 Riddoch et al.
2007/0211626 A1 9/2007 Gooch et al.
2007/0211722 A1* 9/2007 Subramanian ................ 370/390
2008/0056256 A1 3/2008 Cinghita et al.
2008/0101363 A1 5/2008 Li
2008/0232368 A1 9/2008 Ikegami et al.
2009/0059911 A1* 3/2009 Fine .............................. 370/384
2009/0172151 A1 7/2009 Davis
2009/0310609 A1* 12/2009 Fernandez Gutierrez .... 370/390
2009/0319689 A1* 12/2009 Fernandez Gutierrez .... 709/242
2010/0014519 A1* 1/2010 Fernandez Gutierrez .... 370/390
2010/0040056 A1* 2/2010 Kobayashi .................... 370/390
2010/0046516 A1* 2/2010 Fernandez Gutierrez .... 370/390
2010/0054247 A1* 3/2010 Fernandez Gutierrez .... 370/390
2010/0054248 A1* 3/2010 Fernandez Gutierrez .... 370/390
2010/0054249 A1* 3/2010 Fernandez Gutierrez .... 370/390
2010/0172351 A1* 7/2010 Fernandez Gutierrez .... 370/390
2010/0172352 A1* 7/2010 Fernandez Gutierrez .... 370/390
2010/0172353 A1* 7/2010 Fernandez Gutierrez .... 370/390
2010/0220726 A1 9/2010 Lo et al.
2010/0254383 A1* 10/2010 Fernandez Gutierrez .... 370/390
2011/0010441 A1* 1/2011 Gutierrez ...................... 709/223
2011/0019673 A1* 1/2011 Fernandez Gutierrez .... 370/390
2011/0058548 A1* 3/2011 Fernandez Gutierrez .... 370/390
2011/0058551 A1* 3/2011 Fernandez Gutierrez .... 370/390
2011/0085548 A1 4/2011 Fernandez Gutierrez
2011/0149960 A1 6/2011 Fernandez Gutierrez
2011/0305239 A1 12/2011 Chandrashekharachar Suvarneshwar

* cited by examiner

METHOD FOR MANAGING MULTICAST TRAFFIC IN A DATA NETWORK AND NETWORK EQUIPMENT USING SAID METHOD

CROSS-REFERENCE TO RELATED APPLICATION

This application is a Continuation of U.S. application Ser. No. 12/440,225, filed on Apr. 24, 2009, currently allowed, which relates to and claims the benefit of U.S. National Phase Application of International Application No. PCT/EP2007/011043, filed Dec. 17, 2007, which is a PCT application of and claims priority to and the benefit of Spanish Patent Application No. 200702687, filed Oct. 15, 2007.

FIELD OF THE INVENTION

The invention is comprised the field of multicast technology in data networks.

More specifically, the invention relates to a method for managing multicast traffic in a data network, in which sources send multicast traffic in at least one multicast group and a plurality of hosts receive from a network interface of a router the traffic sent by said sources in said multicast group, said hosts and said router communicating with one another by means of a multicast host-router communications protocol by means of which the hosts send to the router messages to request multicast traffic from some sources in a multicast group.

The invention also relates to network equipment applying said method.

STATE OF THE ART

Multicast technology makes it possible to send data from a single source to many recipients through a data network, without having to set up unicast communication, i.e. one-to-one individual communication between the source and each of the recipients. To that end the source sends data, in data packet form, to a single address associated to a multicast group to which the equipment interested in being recipients of said data sending can subscribe. This address, referred to as a multicast address or also as a multicast group address, is an IP (Internet Protocol) address chosen within a range that is reserved for multicast applications. The data packets which have been sent by the source to the multicast address are then replicated in the different network routers so that they can reach the recipients that have joined the multicast group.

The recipients which receive data in a multicast group are usually equipment connected to the data network by means of a proxy or a router. Hereinafter, the common term host will be used to refer to said recipient equipment. A host can be, for example, a computer or a set-top box (digital signal decoder) connected to a television set.

When a host wants to receive the information sent by one or several sources of a multicast group, it sends to the closest router, or to an intermediate proxy, a subscription message to subscribe to said group so that the router transmits to it the data arriving through the data network and which has been sent by the sources of the multicast group. Likewise, when a host wishes to stop receiving data sending in the multicast group, it sends to the router or to the proxy an unsubscribe message to stop receiving them.

The messages exchanged between a host and the closest router to manage membership to a multicast group use the IGMP protocol (Internet Group Management Protocol) or the MLD (Multicast Listener Discovery) protocol, according to whether or not the router works with version 4 (IPv4) or version 6 (IPv6) of the IP protocol (Internet Protocol), respectively.

When there is a proxy between the host and the router, the proxy also uses the IGMP/MLD protocols to exchange with the host, the closest router or other intermediate proxy, the multicast group membership messages. In these cases, the proxy can receive from different hosts requests to subscribe to or to unsubscribe from a multicast group, and it assembles them to thus reduce IGMP/MLD message traffic it sends to the router. Hereinafter, the generic term IGMP proxy will be used to designate a proxy using the IGMP/MLD protocols.

In addition, routers exchange messages with one another for the purpose of defining the routing which allows efficiently routing the data from the sources to the hosts that have subscribed to a multicast group. To that end, the routers use specific protocols, including the very well known PIM-SM (Protocol Independent Multicast—Sparse Mode).

In summary, the routers receive from the hosts, in the form of IGMP/MLD messages, information specifying which multicast groups they want to receive traffic from, and they communicate with other routers, for example by means of the PIM-SM protocol, for the purpose of setting up a routing which takes the traffic requested by the hosts to such hosts.

All the mentioned protocols are defined and documented by the Internet Engineering Task Force (IETF).

The IGMP protocol version currently being used is IGMPv3, which is described in the RFC 3376 specifications published on line by the IETF (B. Cain at al., Engineering Task Force, Network Working Group, Request for Comments 3376, October 2002.

With regard to the MLD protocol, the version currently being used is MLDv2, which is described in the RFC 3810 specifications published on line by the IETF (R. Vida et al., Engineering Task Force, Network Working Group, Request for Comments 3810, June 2004.

The operation of an IGMP proxy is described in the RFC 4605 specifications published on line by the IETF (B. Fenner et al., Engineering Task Force, Network Working Group, Request for Comments 4605, August 2006.

The PIM-SM protocol used for the communication between routers is described in the RFC 4601 specifications published on line by the IETF (B. Fenner et al., Engineering Task Force, Network Working Group, Request for Comments 4601, August 2006.

Multicast technology was initially implemented primarily to be applied to the many-to-many communication model, known as ASM (Any Source Multicast), in which many users communicate with one another and any of them can send data and also receive data from everyone else. A typical ASM application is multiparty calling via Internet.

Multicast technology was then implemented to be applied to the one-to-many communication model known as SSM (Source Specific Multicast), in which a single source sends data for many recipients. Radio and television via Internet are SSM applications. This is why SSM is currently very interesting.

In earlier IGMP protocol versions, a host could not choose the data sending sources it did not want to subscribe to within a multicast group, rather the host could only subscribe to or unsubscribe from the group for all the sources. The messages a host sent to a router were very simple: Join (G) to receive traffic from the multicast group G and Leave (G) to stop receiving it. Therefore, earlier IGMP protocol versions did not allow SSM.

The possibility that the hosts could choose the sources within a multicast group was introduced in the IGMPv3 version of the IGMP protocol to allow SSM. To that end, a host can send IGMP messages containing data blocks referred to as Group Record in which the host defines the sources from which traffic is to be received for each multicast group. These Group Record data blocks in an IGMP message can be of several types:

An INCLUDE type Group Record data block containing information on source IP addresses from which the host wishes to receive data sending. According to the terminology of the RFC 3376 specifications, the sources chosen by means of an IGMP message containing an INCLUDE type Group Record are referred to as INCLUDE sources.

An EXCLUDE type Group Record data block, containing information on source IP addresses from which the host does not wish to receive data sending. In this case, it is interpreted that the host wishes to receive data sent by all the sources of said multicast group except the sources indicated as excluded in the message. According to the terminology of the RFC 3376 specifications, the excluded sources by means of an IGMP message containing an EXCLUDE type Group Record are referred to as EXCLUDE sources.

For clarity's sake, the term INCLUDE message will be used hereinafter to designate an IGMP message containing an INCLUDE type Group Record, and the term EXCLUDE message will be used hereinafter to designate an IGMP message containing an EXCLUDE type Group Record.

To save memory, data traffic or for other reasons, it was decided in the IGMPv3 version that each network interface could operate for each multicast group only in one of the following two modes, being able to switch from one to the other: an INCLUDE mode in which the network interface defines an INCLUDE source list or an EXCLUDE mode in which the network interface defines an EXCLUDE source list.

Each network interface and multicast group has a state record storing the information on said interface and group and said state record contains a field referred to as filter-mode which can only be of the INCLUDE type, containing only INCLUDE sources, or of the EXCLUDE type, containing only EXCLUDE sources. The rules that are transcribed below are applied when the network interface record must result from the combination of different records:

Rule 1. If any of the data sources of a group G1 is EXCLUDE, then the network interface will have an EXCLUDE filter-mode for the group G1 and the source list of the network interface is the intersection of the EXCLUDE source lists minus the sources of the INCLUDE lists.

Rule 2. If all the sources are INCLUDE type sources, then the network interface will have an INCLUDE filter-mode for the group G1 and the source list is the union of all the INCLUDE sources.

These rules are applied in a network interface of equipment operating as an IGMP proxy and receiving INCLUDE messages or EXCLUDE messages from different hosts or from different IGMP proxies located downstream from said network interface (i.e. in the direction going from the router to the hosts). These same rules are also applied in a network interface of equipment, such as a personal computer for example, provided with several sockets receiving different INCLUDE source or EXCLUDE source requests from different applications.

Channel (S, G) is used hereinafter, and according to the common nomenclature in SSM technology, to refer to the sending of source S of the multicast group G.

In the current state of the art, to save memory routers using the IGMPv3 protocol store only the minimum multicast traffic information that they must transmit. This minimum information consists of storing, for each network interface of the router and multicast group, a state reflecting if, for a specific channel (S,G) or multicast group (*,G) there is at least one host interested in receiving said multicast traffic.

In a multicast system operating with the IGMPv3 protocol, different hosts connected directly to a single network interface of a router through a multiaccess network, such as an Ethernet network for example, can send different IGMP messages with multicast traffic requests referring to a single multicast group. Each of these IGMP messages contains its own INCLUDE type or EXCLUDE type sources. The router receiving these IGMP messages has to decide which multicast traffic it must send for each network interface and for each multicast group such that it meets all the traffic requests it has received through said IGMP messages. This problem is solved in the IGMPv3 protocol as follows: when an IGMPv3 router, which is initially transmitting multicast traffic from specific sources of a multicast group G, receives a new IGMPv3 message referring to said group G, it continues transmitting all the traffic from said sources that it was transmitting plus the traffic from the new sources requested in the new IGMPv3 message. Furthermore, to prevent indefinitely transmitting traffic from sources which no host wishes to receive, in specific cases the IGMPv3 router sends a Source-And-Group Specific Query type message to the multicast address G that all the hosts which are receiving traffic from group G listen to find out if there are still hosts interested in continuing to receive the multicast traffic from specific sources.

This solution adopted in the IGMPv3 protocol seems to be a logical solution to the problem of managing the different source requests that different hosts make for a single multicast group. However, as will be seen below in the detailed description of the embodiments of the invention, said solution has the drawback that the implementation thereof involves enormous technical complexity, and it further involves rather inefficient multicast traffic management.

Another problem with the IGMPv3 protocol is that a single host can send a high number of requests to the router and even collapse it. The router is not able to detect this situation and therefore is not able to prevent it.

As will be explained below in the detailed description of embodiments of the invention, another problem with the IGMPv3 protocol is that it also causes drawbacks for managing the interconnection between the IGMPv3 protocol (multicast communications between the router and the hosts) and the PIM-SM protocol (multicast communications between routers), specifically for managing the transmission between these two protocols of the information from the sources requested by the hosts.

SUMMARY OF THE INVENTION

The main purpose of the invention is to provide an improved system of managing multicast communications in a data network.

An object of the invention is to significantly increase the efficiency of the routers that receive multicast traffic requests from the hosts.

Another object of the invention is to prevent the unnecessary consumption of bandwidth that occurs when a router transmits a multicast traffic that no host wants to receive.

Another object of the invention is to prevent the denial of service-type attacks occurring when an attacker sends a number of multicast traffic requests to equipment until collapsing it.

Another object of the invention is to improve the multicast traffic bandwidth management by the routers and the proxies.

For this purpose, a method for managing multicast traffic in a data network, of the type indicated above, has been developed, characterized in that according to said multicast host-router communications protocol, the router receiving one of said messages sent by a host to request multicast traffic from sources in a multicast group obtains in said message identifying data which identify the host that has sent said message, and said router stores in specific records for each network interface of the router, host and multicast group, information about the sources the traffic of which has been requested by said host in said messages sent to said router.

An advantageous development of the invention contemplates that when the message sent by a host to request multicast traffic from sources in a multicast group is a change of state message informing about a variation of the sources from which said host wishes to receive traffic, the router receiving said message updates the information contained in its specific record for said host and, based on the information contained in its specific records for the different hosts which have requested multicast traffic, said router adjusts its multicast traffic transmission without requesting confirmation from the hosts.

In an advantageous embodiment, said identifying data that the router obtains in said messages sent by the hosts to request multicast traffic from sources in a multicast group are the IP (Internet Protocol) address of origin of the IP datagram containing said message. In another advantageous embodiment, said identifying data are the MAC (Media Access Control) address of origin of the data frame that carries the IP (Internet Protocol) datagram containing said message, and said equipment uses said MAC address as said identifying data which identify the host.

The invention also contemplates an embodiment in which a switch analyzes the IP data packets containing said messages sent by the hosts towards the router to request multicast traffic from sources in a multicast group and said switch creates a table with the multicast traffic information that it must send by each of its ports. This embodiment is characterized in that, according to the multicast communications protocol between the hosts and the router, said switch stores, separately for each host that has requested multicast traffic in said messages, the sources from which said host has requested multicast traffic.

In a preferred embodiment, said messages sent by the hosts to request multicast traffic from sources in a multicast group separately contain:

- included source lists of a multicast group, indicating that the host wishes to receive the traffic sent by said included sources;
- excluded source lists of a multicast group, indicating that the host wishes to receive the traffic sent by all the sources of said multicast group except said excluded sources;

and the network equipment receiving said messages separately store for each host the data of said included sources and the data of said excluded sources.

The invention also relates to network equipment suitable for applying the method according to the invention.

The invention particularly comprises network equipment compatible with the method according to the invention and suitable for acting, in its communications with the hosts, as the router of said method, characterized in that it stores executable instructions for:

- when said network equipment receives a message in which a host requests multicast traffic from sources in a multicast group, obtaining from said message identifying data which identify the host that has sent said message, and;
- storing in specific records for each network interface of the router, host and multicast group information about the sources the traffic of which has been requested by said host in said messages sent to said network equipment.

This network equipment according to the invention can be a router and also intermediate equipment suitable for operating as a proxy between the hosts and the router.

In an advantageous embodiment, said network equipment stores executable instructions for analyzing the message sent by the host to request multicast traffic from sources in a multicast group and, if said message is a change of state message informing about a variation of the sources from which said host wishes to receive traffic, updating the information contained in its specific record for said host and, based on the information contained in its specific records for the different hosts which have requested multicast traffic, adjusting the multicast traffic transmission without requesting confirmation from the hosts.

In another embodiment, said network equipment stores executable instructions for reading, in said message in which a host requests multicast traffic from sources in a multicast group, the IP (Internet Protocol) address of origin of the IP datagram containing said message, and using said IP address as said identifying data which identify the host. In another embodiment, said identifying data which the network equipment reads are the MAC (Media Access Control) address of the data frame that carries the IP (Internet Protocol) datagram containing said message, and said equipment uses said MAC address as said identifying data which identify the host.

In an advantageous embodiment, the network equipment according to the invention stores executable instructions for analyzing the information contained in said specific records about the sources the multicast traffic of which has been requested by the different hosts and, based on said information, selectively limiting the multicast traffic which said network equipment transmits to each host.

The network equipment according to the invention preferably stores executable instructions for analyzing the information contained in said specific records about the sources the multicast traffic of which has been requested by the different hosts and, based on said information, balancing the multicast bandwidth which said network equipment has available for distributing it among the various hosts.

In a preferred embodiment, the network equipment according to the invention stores executable instructions for: receiving said messages sent by the hosts to request multicast traffic from sources in a multicast group, when said messages separately contain:

- included source lists of a multicast group, indicating that the host wishes to receive the traffic sent by said included sources;
- excluded source lists of a multicast group, indicating that the host wishes to receive the traffic sent by all the sources of said multicast group except said excluded sources;

and separately storing for each network interface of said network equipment and multicast group the data of said included sources and the data of said excluded sources.

The invention also relates to network equipment compatible with the method according to the invention, in which said network equipment is a switch suitable for analyzing the IP data packets containing said messages sent by the hosts towards the router to request multicast traffic from sources in a multicast group, and creating a table with the multicast traffic information which said switch must send for each of its ports, characterized in that it stores executable instructions for separately storing for each switch port, multicast group and host that has requested multicast traffic in said messages, the sources from which said host has requested multicast traffic.

BRIEF DESCRIPTION OF THE DRAWINGS

Other advantages and features of the invention can be seen in the following description in which, with a non-limiting character, preferred embodiments of the invention are referred to in relation to the attached drawings.

DETAILED DESCRIPTION OF EMBODIMENTS OF THE INVENTION

Figure 1:
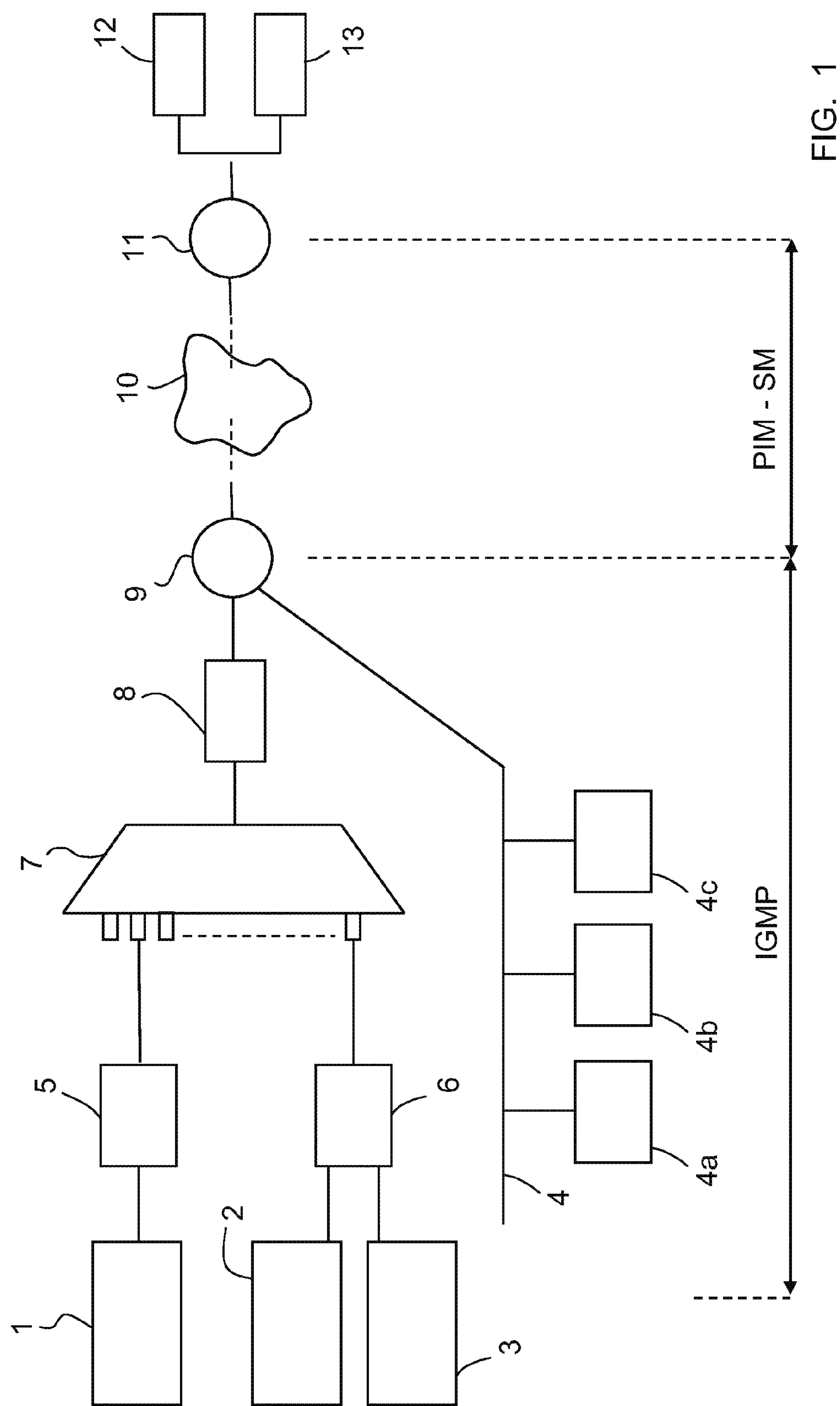
FIG. 1 shows a basic example of a multicast system in a data network in which the present invention is applicable.

FIG. 1 shows a basic example of a multicast system in a data network. In this example, six hosts 1, 2, 3, 4*e*, 4*b*, 4*c* are connected to the data network. Hosts 1, 2 and 3 are connected through several CPE 5, 6 (CPE: Customer-Premises Equipment). A CPE is a connection terminal to the network that is located on the subscriber access line side, which is communicated for example by means of a DSL (Digital Subscriber Line) modem. The hosts 2 and 3 are both connected to a single CPE 6 of a subscriber line. CPEs 5, 6 are connected to a DSLAM 7 (DSLAM: Digital Subscriber Line Access Multiplexer) which directs traffic from the different CPEs 5, 6 through a switch 8 to a router 9 which is in turn connected to an IP network 10. Another router 11, which transmits the data packets sent by sources 12, 13, is connected to another point of the IP network 10. The hosts 4*a*, 4*b*, 4*c* are connected directly to a single network interface of the router 9 through a multiaccess network which in this case is an Ethernet network represented by line 4.

For clarity's sake. FIG. 1 shows a single group formed by several hosts 1, 2, 3, 4*a*, 4*b*, 4*c* connected to a router 9, and a single group of sources 12, 13 connected to a router 11. Of course, a multicast system is in reality made up of a large number of these assemblies and groups.

The particular distribution of the different network equipment in FIG. 1 is also a very simple case the only purpose of which is to illustrate the following explanations. The invention is obviously applied to any other possible distribution.

FIG. 1 also shows the scope of each of the IGMP and PIM-SM protocols: the IGMP protocol is applied to communications between the receiving hosts and the routers, through the CPEs and the DSLAMs, whereas the PIM-SM protocol is applied to communications between different routers through the IP network. The router 9 is located in the border between these two types of communications and uses both protocols. The router 9 treats the information contained in the IGMP messages reaching it from the hosts and sends, towards other routers of the network, such as the router 11 for example, corresponding PIM-SM messages so that said routers transmit to it the channels requested by the hosts in said IGMP messages.

It has been assumed in this example that the routers operate with the IPv4 version of the IP protocol and therefore the system uses the IGMP protocol. However, the reasons set forth are also applied to a system using the MLD protocol (used in the IPv6 version of the IP protocol).

The CPEs and the DSLAMs are equipment that can carry out an IGMP proxy function consisting of receiving several IGMP requests and assembling them to reduce the volume of IGMP messages which are sent to the router. This operation is described in the RFC 4605 specifications of the IETF mentioned above.

The basic operation of the multicast system shown in FIG. 1 is as follows.

Hosts 1, 2, 3 send IGMPv3 messages to CPEs 5, 6 in which they identify the multicast address of a multicast group and the source addresses of said multicast group from which they wish to receive a data sending. These IGMP messages are INCLUDE type or EXCLUDE type. The CPEs receiving several IGMP messages from different hosts, as is the case of CPE 6 in the example of FIG. 1, assemble these IGMP messages to send DSLAM 8 a single IGMP message. For its part, DSLAM 7 receives IGMP messages from different CPEs, in this case CPEs 5 and 6, and assembles them to send to router 9, through a switch 8, an IGMP message in which only the INCLUDE or EXCLUDE sources are indicated for each multicast group. hosts 4*a*, 4*b*, 4*c* are connected directly to router 9 through the Ethernet network 4, whereby they send directly to said router 9 their IGMP messages.

CPE 6 and DSLAM 7 operate as an IGMP proxy, i.e. as intermediate equipment between the host and the IGMP router receiving IGMP traffic requests through its network interfaces connected to the host or to other IGMP proxies, assembling the information and sending a summarized IGMP message through the network interface connecting the IGMP proxy with the IGMP router. An IGMP proxy behaves like an IGMP router in its communications with the host and behaves like a host in its communication with an IGMP router. Therefore, seen from DSLAM 7 CPE 6 is equivalent to a host. Likewise, seen from router 9 DSLAM 7 is equivalent to a host.

CPE 5, however, is connected to a single host 1 and transmits towards the router 9 IGMP messages corresponding to the IGMP messages sent by said host.

DSLAM 7 therefore receives IGMP messages from the host 1 which pass through CPE 5 and IGMP messages from CPE 6 which, seen from DSLAM 7, behaves like a host. For its part, router 9 receives IGMP messages directly from hosts 4*a*, 4*b*, 4*c* and IGMP messages from DSLAM 7 which, seen from the 9, behaves like a host.

Router 9 receives IGMP messages sent by DSLAM 7 through switch 8 and by hosts 4*a*, 4*b*, 4*c* directly and communicates with other IP network routers using the PIM-SM protocol for communicating with router 11 and setting up routing through the IP network making the data sent by the sources specified in the IGMP message received by router 9 reach router 9 from router 11.

1) Operation of Network Equipment Belonging to the Prior State of the Art Using the IGMPv3 Protocol To show the features and advantages of the invention, the operation of network equipment applying the IGMPv3 protocol according to the state of the art is first described.

To explain the way of assembling messages in a proxy using the IGMPv3 protocol, the RFC 4605 specifications, defining the operation of the IGMP proxy, refer to section 3.2 of RFC 3376 defining the IGMPv3 protocol. The rules are the same as those which have been explained above to deduce the state of a network interface of a host based on several records. These rules adapted to the operation in an IGMP proxy are reproduced below:

Rule 1. For a specific network interface and multicast group, if any of the data sources of the received messages of the group is EXCLUDE, then an EXCLUDE type message is sent for the group and the source list of the message is the intersection of the EXCLUDE source lists minus the sources of the INCLUDE messages.

Rule 2. For a specific network interface and multicast group, if all the data sources of the received messages of the group are of the INCLUDE type, then an INCLUDE type message is sent for the group and the source list of the network interface is the union of all the INCLUDE sources.

Therefore, the method applied by an IGMP proxy consists of assembling the sources of the different messages of each multicast group received in each proxy network interface without taking into account which host sends the message: the proxy stores in which network interface the IGMP message has been received, but it does not store the identification of the host that has requested each source.

The same occurs in an IGMP router, the operation of which is explained in section 6 of RFC 3376. For each network interface of the IGMP router and for each multicast group, the IGMP router stores the information of the channels and multicast groups requested but it does not store the identification of the host requesting each channel or each multicast group.

The IGMP routers periodically send to the hosts messages referred to as Membership Query messages so that the hosts reply informing about the groups and sources from which they wish to receive multicast traffic. The hosts can also send messages to the router to request multicast traffic without waiting for the router to send a Membership Query message.

The routers execute the IGMP protocol in all the networks they are directly connected to. If a multicast router has more than one network interface connected to the same network it only needs to execute the protocol in one of said network interfaces.

For each network card or network interface, and for each multicast group, the IGMP routers store the information of the INCLUDE and EXCLUDE multicast sources in one record:

Record: (multicast-address, group-timer, filter-mode, {(source-address, source-timer)})

wherein multicast-address is the multicast group;

{(Source-address, source-timer)} is a list of elements (source-address, source-timer), source-address being the source IP address and source-timer being a timer associated to said source;

filter-mode can be INCLUDE or EXCLUDE and it has the same operation as that described in RFC 3376: to indicate if the sources of the source list and timers are INCLUDE sources or EXCLUDE sources;

group-timer is a timer used as a mechanism for the transition of the filter-mode of a state record of the router from EXCLUDE mode to INCLUDE mode. When the group-timer of a specific multicast group and network interface reaches zero, the router assumes that there are no longer hosts with EXCLUDE filter-mode connected to said network interface and it switches to the INCLUDE mode.

The value of the timers gradually drops over time and if the router receives a Membership Report message from a host the router reinitiates the corresponding timers.

If the record has an INCLUDE filter-mode, the timers operate in the following manner: for a specific network interface, a specific multicast group and a specific included source-address, as long as the source-timer is greater than zero the router will continue transmitting through said network interface the multicast traffic from the channel (source, multicast group); when the source-timer reaches zero, the router will stop transmitting said traffic and will eliminate the source from the INCLUDE source list of that multicast group.

If the record has a EXCLUDE filter-mode the timers operate in a similar manner, but with the difference that the EXCLUDE sources are classified in two lists: a first list referred to as Requested List containing the sources the source-timer of which has a value greater than zero and a second list referred to as Exclude List containing the sources the source-timer of which has a value zero.

If a record has an EXCLUDE filter-mode for a specific multicast group, the router transmits all the traffic from all the sources of said multicast group except the EXCLUDE sources of the Exclude List.

The router also uses the timers to make sure that, after having sent a Group Specific Query message or a Group and Source Specific Query message, all the hosts have had enough time to reply to said message.

There are several reasons for the existence of a Requested List in IGMPv3. One of them is that in a network with several hosts sending messages to an IGMP router, it is possible that there could be a conflict between the requests of the different hosts. This occurs, for example, when a host requests traffic from a specific source and another host requests traffic excluding said source. For example, a host 4*a* sends a first EXCLUDE({S1},G1) message and another host 4*b* in the same Ethernet network then sends a second EXCLUDE({S1, S2,S3},G1) message to the same router. Upon receiving the second message, it the router places the sources {S1,S2,S3} of the second message in the Exclude List, the host 4*a* would stop receiving traffic from sources S2 and S3 that it wanted to receive because it wanted to receive all the traffic except the traffic from source S1. To avoid this problem, the IGMP router places in the Exclude List only the intersection of the set of sources of the new message with the set of sources that there were in the Exclude List before receiving said message. The remaining EXCLUDE sources go to the Requested List and, optionally, the router sends a Group-And-Source-Specific Query message to the hosts to ask if there is any host that is still interested in receiving traffic from sources S2 and S3 of group G1.

Table 1 (at the end of this document), extracted from the RFC 3376, summarizes the operation of a router according to the IGMPv3 protocol.

In Table 1, the first column "State 1" shows the initial state of the record of the IGMP router; the second column "Message" shows the content of a Membership Report message received by the IGMP router; the third column "State 2" shows the state of said record of the IGMP router after having received the Membership Report message; the fourth and last column "Actions" shows the actions that the IGMP router carries out after having received said Membership Report message. Table 1 contains 12 rows respectively corresponding to 12 examples which each illustrates the operation of the router according to its initial state (column 1) and according to the messages it has received (column 2). Each row of Table 1 is separated from another row by a dotted line, Table 1 relates to a specific network interface of the IGMP router executing the IGMPv3 protocol and a specific multicast group G. Each network interface and multicast group G will have their own state records which will be affected by the messages that the IGMP router receives through said network interface referring to said group G.

The following nomenclature has been used in Table 1:

(A+B) means the union of the sets of sources A and B.

(A*B) means the intersection of the sets of sources A and B.

(A−B) means the set sources A minus the sources of A that are also found in B.

INCLUDE (A) indicates that the IGMP router has a record with INCLUDE filter-mode with a set of sources A.

EXCLUDE (X,Y) indicates that the IGMP router has a record with EXCLUDE filter-mode because there are EXCLUDE sources, wherein:

X is the Requested List of EXCLUDE sources

Y is the Exclude List of EXCLUDE sources.

GMI is a parameter referred to as Group Membership Interval containing a value of time. A value of 260 seconds is used by default.

T (S) is the source timer of source S.

GT is the Group Timer, i.e. the timer of the record for switching from EXCLUDE mode to INCLUDE mode.

SEND Q(G, S) means that the IGMP router sends a Group-And-Source-Specific Query message to the hosts to check if there is still a host interested in receiving the sendings from sources S of multicast group G. When this action is carried out, the IGMP router also reduces the timers of the sources S to the LMQT value. If the IGMP router receives in response a message showing interest in any of the sources S, it then initializes the value of the timers of said sources, for which there is an interested host, to an initial value equal to GMI.

DEL(A) means that the IGMP router deletes from the record the sources of list A.

LMQT is a parameter referred to as Last Member Query Time containing a time value. It is the time a host has to reply to a Group-And-Source-Specific Query type message which has been sent by the IGMP routers. After this time, if no host replies that it is interested in receiving the channels specified in said message, the GMP router stops transmitting them. The value of LMQT in the IGMPv3 protocol is 20 seconds by default.

The messages in column 2 of Table 1 are the six types of IGMP messages defined in the IGMPv3 protocol for indicating to the router the sources from which it wishes to obtain multicast traffic. The meaning of these six IGMP messages is described in RFC 3376 (chapter 4.2.12) and is as follows:

IS_IN (Z), IS_EX (Z) indicate that the network interface of the host that has sent the message has an INCLUDE or EXCLUDE filter-mode, respectively, for the sources of list Z.

TO_IN (Z), TO_EX (Z) indicate that the network interface of the host that has sent the message has switched the filter-mode from EXCLUDE mode to INCLUDE mode, or from INCLUDE mode to EXCLUDE mode, respectively, for the sources of list Z.

ALLOW (Z) indicates that the network interface of the host that has sent the message wishes to receive the traffic from the new sources of list Z. These sources are the sources that said network interface will add to its INCLUDE source list or they are the sources that it will delete from its EXCLUDE source list.

BLOCK (Z) indicates that the network interface of the host that has sent the message no longer wishes to receive traffic from the sources of list Z. These sources are the sources that said network interface will delete from its INCLUDE source list or they are the sources that it will add to its EXCLUDE source list.

It can be seen that the 12 rows of Table 1 correspond to the 12 possible combinations of an initial state record of the router (column 1) and of a type of IGMP message received (column 2).

The router always consults the hosts by means of a Group-And-Source-Specific Query message (SEND messages in column 4 of Table 1) for checking if there is any host interested in receiving those sources the traffic of which was being initially transmitted (column 1 of Table 1) and no longer wishes to receive according to the sources indicated in the last received IGMPv3 message (column 2 of Table 1). This operation is inefficient because unnecessary Group-And-Source-Specific Query type messages are sent, and furthermore traffic is transmitted from sources that no host wishes to receive. Managing these situations in the twelve cases of Table 1 further involves enormous technical complexity.

It is also common for users of a multicast system, who act through the hosts, to have a behavior known as zapping, which consists of quickly and successively changing channels. When a host requests a new channel, the IGMP router initiates the transmission of said channel but it does not stop it when the host changes the channel again, but rather the router sends a Group-And-Source-Specific Query message and maintains the transmission during the LMQT time. If this occurs repeatedly in a short time frame, the IGMP router has to manage all these messages and it will further be uselessly sending the entire series of channels through which the user has passed by zapping.

Table 2 (at the end of this document) shows a specific example illustrating these inefficiencies. The example of Table 2 relates to the case of a host which changes channels within a multicast group G. Column 1 of the table shows the successive IGMP messages sent by the host, column 2 shows the source list the traffic of which the router sends after having received said IGMP message, and column 3 shows the actions performed by the router after having received said IGMP message. The two messages SEND Q(G, S1) and SEND Q(G, S2) (Group-And-Source-Specific Query messages sent by the router) in column 3 of Table 2 are unnecessary because the host no longer wishes to receive the traffic sent by sources S1 and S2 indicated respectively in said messages. It is also unnecessary for the router to transmit channels (S1, G) and (S2, G) during the LMQT time.

The management of unnecessary messages by the router involves considerable consumption of calculation capacity that could be avoided. Furthermore, unwanted traffic transmission unnecessarily consumes bandwidth. These inefficiencies are multiplied in the router when there are thousands of hosts changing channels.

2) First Embodiment of the Invention

The operation of the network equipment applying the IGMP protocol according to the invention is similar to that of the network equipment of the state of the art applying the IGMPv3 and MLDv2 protocols. To that end, to aid in understanding, the same nomenclature has been used below as what is used in the RFC 3376 (IGMPv3 protocol) and RFC 3810 (MLDv2 protocol) specifications mentioned above.

Furthermore, since the operation of the IGMP protocol according to the invention is similar to the operation of the IGMPv3 protocol, all the features that are common to IGMPv3 are not explained.

The main feature of the invention consists of the fact that the network equipment receiving IGMPv3 messages by means of which the hosts request multicast traffic, such as an IGMPv3 router, a switch and an IGMPv3 proxy, store in a table the separate information of the sources which each host sending IGMPv3 messages requests, requesting multicast traffic along with a unique identifier of the host that has sent each message.

To that end, this network equipment maintains a state record for each network interface, multicast group and host sending the message, thereby knowing exactly which multicast traffic sources are requested by each host independently.

Upon storing the information separately, identifying the requests of each host, there are no longer conflicts between the sources requested in the messages from different hosts, because when a host sends a message to stop receiving a specific channel (S,G) to a network interface of an IGMP router, said router knows exactly if there is another host connected a that same network interface and interested in receiving that same channel (S,G). If there is another interested host, the IGMP router continues transmitting the channel (S,G), but if there is no other interested host, it stops sending the channel (S,G) in the very moment it receives the message asking it to stop transmitting it, without needing to send a Group-And-Source-Specific Query message and waiting for the reply.

As indicated in RFC 3376, at the beginning of section 4, the IGMP messages are encapsulated in IPv4 datagrams, with protocol number 2. An IPv4 datagram contains a field indicating the IP address of the equipment sending said datagram.

A particularly effective way of implementing the present invention consists of using, as an identifier of the equipment sending each IGMP message, the IP address of said equipment. It is possible that some equipment sending IGMP messages does not have its own IP. This occurs, for example, in some types of DSLAM sending the IGMP messages using IP 0.0.0.0. In these cases, it is possible to assign an IP address to the DSLAM and the latter will use it in its IGMP messages.

The MAC (Media Access Control) address of the data frame encapsulating the IP data packet carrying the IGMP message sent by the host can also be used as an identifier of said host. The use of this identifier is particularly useful in switches implementing the present invention since switches are level 2 equipment knowing in which port each equipment is connected, identifying it by its MAC address and not by its IP address.

The operation of the IGMP protocol according to the invention in each network equipment: the improved IGMP router, the improved IGMP proxy and an improved switch performing the IGMP snooping function, is described in detail below.

2.1) Operation of an Improved IGMP Router According to the Invention

The main difference with regard to IGMP routers of the state of the art applying the IGMPv3 and MLDv2 protocols is that the improved IGMP router according to the invention has a state record for each network interface, multicast group and host of origin, in which it stores the sources requested by each host:

Record: (interface, multicast-address, hostlD, group-timer, filter-mode {(source-address, source-timer)})

wherein interface indicates the network interface of the router through which the ICMP router has received the IGMP message;

multicast-address is the multicast group;

hostID is an identifier of the host that has sent the IGMP message;

{(source-address, source-timer)} is a list of elements (source-address, source-timer), where source-address is the source IP address and where source-timer is a timer associated to said source;

filter-mode can be INCLUDE or EXCLUDE and has the same operation as that described in RFC 3376: to indicate if the sources of the source list and timers are INCLUDE sources or EXCLUDE sources.

In the state records having an EXCLUDE filter-mode the EXCLUDE sources are classified in two lists: a first list referred to as Requested List containing the sources the source-tinier of which has a value greater than zero and a second list referred to as Exclude List containing the sources the source-timer of which has value zero.

The principle for classifying the EXCLUDE sources into two lists, Requested List and Exclude List, according to the value of the source-timer is similar to the one applied in the IGMPv3 and MLDv2 protocols. The RFC 3810 specifications (MLDv2 protocol) mentioned above contain an explanation of this principle.

Each message that the IGMP router receives through a specific network interface, from a specific host and referring to a specific multicast group, affects only the state record of said network interface, host and multicast group.

Thanks to the fact that the improved IGMP router identifies the origin of each IGMP message, it can behave in a deterministic manner for each host, i.e. the messages from each host determine the state of the router records associated with said host and it is not necessary to consult other hosts or take other hosts into account.

This deterministic behavior of the IGMP router is clearly shown in Table 3 (at the end of this document), which is similar to Table 1 but for an improved IGMP router according to the invention.

Table 1 relates to a specific network interface of the router and multicast group, whereas Table 3 relates to a specific network interface of the router, a specific multicast group and a specific host sending IGMP messages.

Both tables show the same combinations of initial states (column 1) and received IGMP messages (column 2), but as can be seen, the final states (column 3) and the actions of the IGMP router (column 4) are different. It can particularly be seen that in Table 3, column 4 (actions performed by the IGMP router) contains no SEND Q(G,S) message, since the improved IGMP router according to the invention does not need to send Group-And-Source-Specific Query messages to check if there is any host interested in receiving channel (S,G).

When the improved IGMP router has to decide if it must transmit a specific channel through a specific network interface, the algorithm of said router takes into account the different state records of the host referring to said multicast group and said network interface.

For a specific network interface, a specific multicast group G, and a specific INCLUDE source S, as long as there is a state record of a host referring to said network interface and said multicast group G the filter-mode of which is INCLUDE and the source-timer of which associated to said INCLUDE source S is greater than zero, the improved IGMP router will transmit through said network interface the multicast traffic of channel (S,G). Furthermore, if for said network interface and multicast group G there are state records the filter-mode of which is EXCLUDE, the improved GMP router will further transmit through said network interface the multicast traffic from all the sources except the sources of the set resulting from the intersection of all the Exclude Lists of said state records with EXCLUDE filter-mode for said network interface and multicast group G.

When the timer associated to a specific INCLUDE source S of a state record with INCLUDE filter-mode reaches zero, said source S is eliminated from the INCLUDE source list of said state record.

When a state record with INCLUDE filter-mode does not contain any source in its INCLUDE list, said state record is eliminated.

The Requested List continues to be necessary in the improved IGMP router for switching a state record from EXCLUDE lifter-mode to INCLUDE filter-mode, as explained in section 3 of Appendix A of RFC 3376.

Another advantage of maintaining the Requested List is that it allows effectively managing the situation occurring when the improved IGMP router has a record with an EXCLUDE filter-mode for a specific network interface of said router, a specific multicast group and a specific host, and said router receives from that same host a second message indicating to it that it wishes to receive traffic from a specific source S1, for example an ALLOW (S1) message. In this case if the router eliminates the source S1 from the Exclude List, and if the Requested List did not exist, said router would lose the IP address information for source S1 and would have to use ASM-type routing algorithms to receive the traffic from source S1. Upon maintaining the information of S1 in the Requested List, said information is not lost and can be used by the router to directly access source S1.

2.2) Operation of an Improved IGMP Proxy According to the Invention

As explained above, an IGMP proxy is intermediate equipment between the host and the IGMP router receiving IGMP traffic requests through its network interfaces connected to the hosts or to other IGMP proxies, assembles the information and sends a summarized IGMP message through the network interface connecting the IGMP proxy with the IGMP router.

The network interfaces connecting the IGMP proxy with the host are referred to as downstream interfaces and there may be hundreds or thousands of them in a single IGMP proxy. In each downstream interface the IGMP proxy performs the function of an IGMP router.

However, there is only one network interface connecting the IGMP proxy with the IGMP router and is referred to as the upstream network interface.

An IGMP proxy behaves like an IGMP router in its communications with the host connected to its downstream interfaces and behaves like a host in its communication with the IGMP router through its upstream interface.

This can all be applied both to an IGMP proxy of the prior state of the art and to an improved IGMP proxy according to the invention.

The main difference between the improved IGMP proxy according to the present invention with regard to an IGMPv3/MLDv2 proxy of the prior state of the art described in RFC 4605 is that since the improved IGMP proxy behaves like an improved IGMP router in each downstream interface, it has a state record storing the sources requested for each multicast group, host of origin and downstream network interlace connected to said host of origin from which the proxy receives IGMP messages requesting multicast traffic.

An IGMP proxy of the prior state of the art stores the sources requested for each multicast group and downstream network interface. However, it does not store the information of the sources that each host requests and it cannot have a deterministic behavior such as that explained above for the improved IGMP router. This occurs even when there is only one host connected to each downstream interface because, since the IGMP proxy does not identify each host, it does not know how many hosts are sending IGMP messages to each network interface and does not detect that there is only one host.

However, in the improved IGMP proxy the information of the host of origin sending each IGMP message is identified and stored, and a separate record is maintained for each host of origin storing the sources that each host requests.

This difference allows the improved IGMP proxy to have a deterministic behavior similar to that which has been previously described for the improved IGMP router and, as in the case of the improved IGMP router, it allows the Group-And-Source-Specific Query messages to be eliminated, immediately stopping the sending of multicast channels that no host requires.

In a preferred embodiment, the identification of the host of origin is carried out in the same manner as for the improved IGMP router, as explained previously: using the IP address of the host of origin or the MAC address that the host uses for sending IGMP messages to the proxy.

2.3) Operation of an Improved Switch According to the Invention Performing IGMP Snooping The RFC 4541 specifications edited on line by the IETF (M. Christensen et al., Engineering Task Force, Network Working Group, Request for Comments 4541, 25 May 2006 describe the operation of a switch performing a function referred to as IGMP snooping, which prevents all the multicast data packets having to be sent to all the switch ports (this is what occurs by default when the IGMP snooping function is not performed).

By means of the technique referred to as snooping, the switch, which in theory is level 2 equipment in the OSI (Open Systems Interconnection) model and neither knows nor uses level 3 protocols such as IP protocol, analyzes the IP data packets containing IGMP messages and creates a table with the information of the groups or multicast channels that must be sent by each switch port. The switch thus sends for each of its ports only the multicast channels which the hosts connected to said port have requested.

The improved switch according to the present invention differs from a switch of the prior state of the art in that the information it obtains by means of snooping is stored such that the sources requested by each host of origin sending an IGMP message are stored for each switch port.

When the improved switch receives an IGMP message through a specific port, referring to a specific multicast group and coming from a specific host, it updates its state table in the same manner as an improved IGMP router according to the invention, as previously explained. The improved switch thus keeps the information in the state table updated.

The improved switch knows the improved IGMP protocol operation of the present invention using the improved IGMP router and the improved IGMP proxy and makes its decision to send or not send the traffic from a specific multicast channel to a specific network interface taking into account if the IGMP router and the IGMP proxy are using the normal IGMP protocol or the IGMP protocol improved by the present invention.

Therefore, for example, the improved switch does not wait for an improved IGMP router to send a Group-And-Source-Specific Query type message in response to an GMP BLOCK (B) type message coming from a specific host and referring to a specific multicast group G, and nor does it wait for the hosts to reply to said message. The improved switch decides in the very moment in which it receives the BLOCK(B) message through a port whether or not it should continue to transmit through said port the traffic from source B of multicast group G1 by analyzing its table containing the information extracted by snooping of the received IGMP messages for each switch port and instantly checking if there is any other host connected to said port which is still interested in receiving the traffic from source B of said multicast group.

In order to differentiate if the IGMP routers and the IGMP proxies are of the standard type or of the improved type according to the present invention, the improved switch according to the present invention has a table which allows said information to be manually configured. The improved switch can alternatively detect if the router is an improved router by checking if the latter sends Group-And-Source-Specific Query messages. If the improved switch detects that the router sends such messages, it then deduces from this that it is a normal router (i.e. it is not an improved router).

2.4) Operation of an IGMP Router or of an Improved IGMP Proxy According to the Invention Regarding Bandwidth Limitation and Denial of Service Type Attacks An additional advantage of the improved IGMP router and of the improved IGMP proxy according to the present invention is that, since they identify the host of origin of each IGMP message and store this information, they can establish traffic limitations for each host to prevent that a single host can request a high number of multicast channels. They can also balance the available bandwidth among the various hosts.

Limiting the multicast traffic to each host allows preventing the problem of IT security referred to as denial of service attack occurring when an attacker sends a high number of traffic requests to an equipment until collapsing it.

The improved IGMP proxy according to the present invention can establish a multicast traffic limit for each host of origin such that when a host exceeds said multicast traffic level, said proxy stops transmitting to the host the new multicast channels that it requests. The improved IGMP proxy can optionally send an error message to the host of origin when this occurs.

The improved IGMP proxy allows configuring the multicast traffic level allowed in each downstream interface independently, to thus offer each user a multicast traffic level adapted to his or her needs.

The IGMP proxy improved by the present invention can also balance the available multicast bandwidth for distributing it among the various users, further taking into account in said distribution the multicast traffic limit that each user has contracted.

Therefore, for example, an improved IGMP proxy having 1 Gbit/s of multicast bandwidth and having 100 users requesting multicast traffic at a specific time establishes a traffic limitation for each user in a manner that is proportional to the bandwidth such user has contracted. If 75 users have contracted 10 Mbit/s and 25 users have contracted 50 Mbit/s, said proxy calculates the sum: (75×10)+(25×50)=2000 Mbit/s=2 Gbit/s and, since the total bandwidth of said proxy is 1 Gbit's, said proxy establishes a consistent limitation, for example, in that each user can only use 50% of the contracted multicast traffic at that time.

The improved IGMP router can also establish the same limitations and functions that have just been explained for the improved IGMP proxy.

3) Second Embodiment of the Invention

The inefficiencies that have been explained in the previous example referring to the IGMP protocol also exist, though in a different manner, in PIM-SM communications between routers, i.e. in communications between routers using the PIM-SM protocol for transmitting multicast traffic between one another.

The PIM-SM protocol uses a timer referred to as Prune Pending Timer or PPT timer which introduces a delay when the PIM-SM routers receive a PRUNE message, for the purpose of giving time for the possible JOIN messages to arrive from other routers interested in continuing to receive traffic which, according to the PRUNE message, the router should stop transmitting. If these JOIN messages arrive, they cancel out the effect of the PRUNE message. As long as PPT timer has not reached zero, the router does not cut off traffic transmission. This PIM-SM communications operation generates problems similar to those which have been previously explained for IGMP communications: a PIM-SM router has to manage a complicated system to be sure that it does not erroneously cut off multicast traffic transmission and it must furthermore be transmitting multicast traffic even though there is no router interested in receiving said traffic.

The applicant is investigating solutions to overcome these problems in PIM-SM communications between routers. By associating these solutions with the present invention, which is applied to GMP communications between hosts and an GMP router, a much more efficient system would be obtained in the whole of multicast communications between hosts and sources. The investigation conducted by the applicant has shown that there is a technical problem in relation to the structure of the GMP protocol making it difficult to overcome these problems when both GMP and PIM-SM protocols are integrated.

An example illustrating what said technical problem consists of and how it is possible to overcome it is described below. Some basic aspects of the PIM-SM protocol operation are first explained (for a complete description refer to the RFC 4601 specifications mentioned above).

The name PIM-SM router will be used hereinafter to designate a router using the PIM-SM protocol for communicating with other routers. The names RP router and RP tree will also be used. The RP (Rendez-vous Point) router is a PIM-SM router which has been designated as responsible for knowing all the sources of a single multicast domain (set of routers using a single RP router) for a multicast group. An RP (Rendez-vous Point) tree is a routing tree for routing traffic through the RP router.

A PIM-SM router can send four types of messages with traffic requests to another PIM-SM router. These four types of requests are not alternatives, i.e. a single PIM-SM router can simultaneously send requests of the four different types to another PIM-SM router. The four types of requests are as follows:

1. JOIN/PRUNE (*,*,RP)

When a PIM-SM router sends a JOIN message of this type to another PIM-SM router, it is indicating that it wishes to receive the multicast traffic from all the multicast groups managed by the Rendez-vous Point router indicated in the RP parameter.

2. JOIN/PRUNE (*,G)

This is used to receive (JOIN) or to stop receiving (PRUNE) all the traffic from a specific multicast group G, i.e. the traffic from all channels (S,G) having said group G as multicast group.

3. JOIN/PRUNE (S,G).

This is used to receive or to stop receiving the multicast traffic from group G coming from source S.

4. JOIN/PRUNE (S,G,rpt)

This is used together with (*, G) to stop receiving (PRUNE) the traffic from a certain source S of the multicast group G even though the interface of the router has a JOIN (*,G) state. The JOIN (S,G,rpt) message is used to receive traffic from said source again.

A PIM-SM router which wishes to receive, or to stop receiving, specific multicast traffic indicates to another PIM-SM router if it should transmit said traffic or not. To that end, it basically uses two types of PIM-SM messages: a JOIN message for indicating that it wishes to receive specific multicast traffic and a PRUNE message for indicating that it does not wish to receive it. For example, a JOIN(Si, Gj) message indicates that the router wishes to receive the traffic sent by source Si in group Gj. A PRUNE(*, Gi) message indicates that the PIM-SM router wishes to stop receiving the traffic sent by all the sources in group Gi.

Each PIM-SM router stores the information of the messages it receives in state records which allow it to know which traffic it should transmit to the other routers.

PIM-SM uses different state records for storing the four different types of multicast traffic requests that have previously been explained. Each of these four state records in a PIM-SM router is updated when the PIM-SM router receives a JOIN or PRUNE message which has been sent by another PIM-SM router and which relates to the same type of multicast traffic and the same multicast group as that of the state record.

Figure 2:
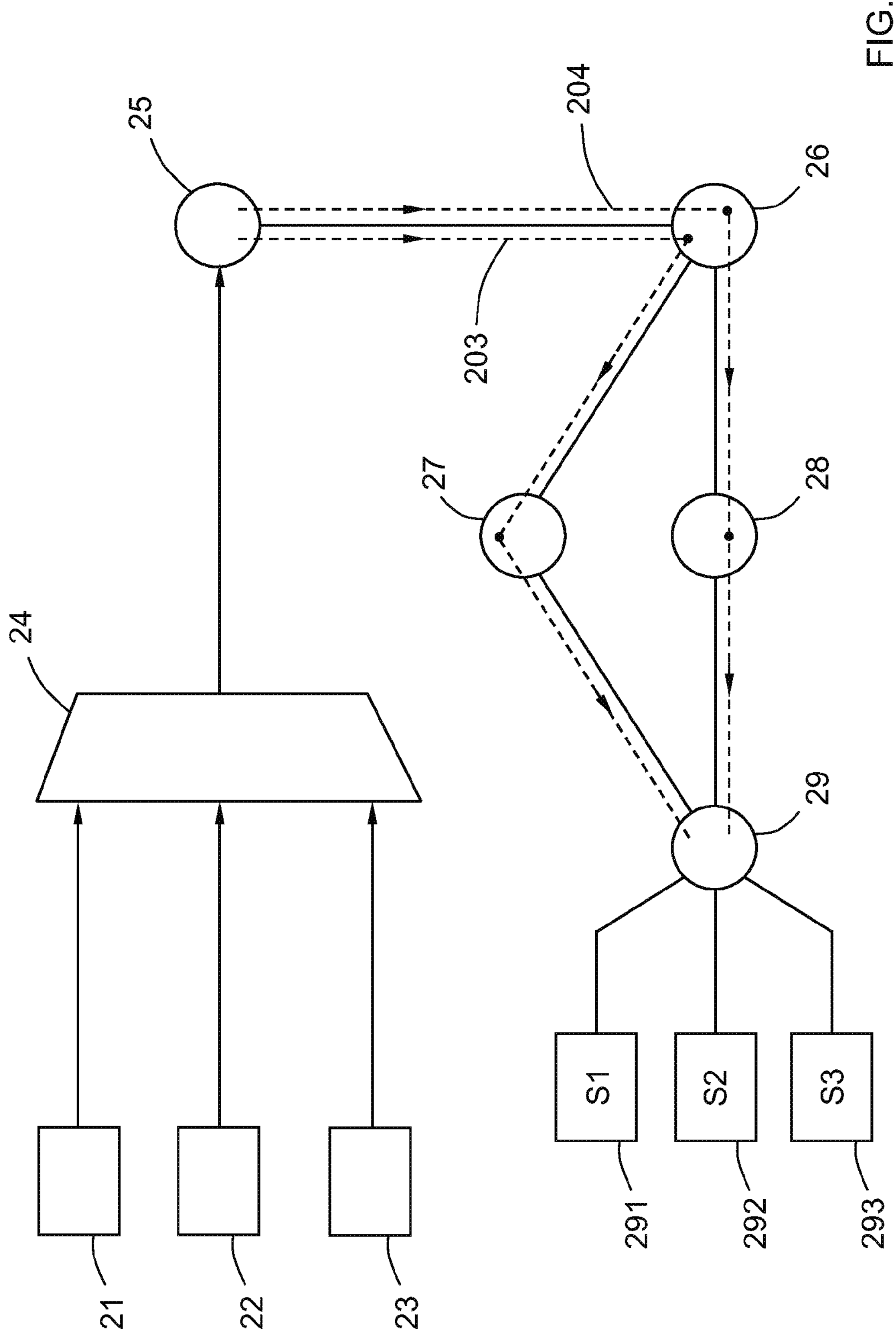
FIG. 2 shows another basic example of a multicast system in a data network illustrating the problem solved by a specific embodiment of the invention.

FIG. 2 shows a basic example of a multicast system in a data network. In this example, three hosts 21, 22, 23 are connected to router 25 through a DSLAM 24 performing the functions of an IGMP proxy. Multicast communications between hosts 21, 22, 23 and router 25 use the IGMPv3 protocol. Router 25 is an IGMP/PIM-SM router which is connected to other PIM-SM routers 26, 27, 28 and 29 of an IP network, as shown in the figure. Router 27 is an RP router for multicast group G1. Router 29 is connected to three sources S1, S2, S3 sending multicast traffic in group G1. Sources S1, S2, S3 have reference numbers 291, 292 and 293. Routers 26 and 28 are intermediate routers between router 25 and router 29. As can be seen in the figure, multicast traffic between router 25 and router 29 can travel through two different paths: path 203 through routers 26 and 27, and path 204 through routers 26 and 28. The question of which path the traffic follows in each moment goes beyond this basic explanation and for that reason is not herein detailed (for a complete description refer to the RFC 4601 specifications mentioned above).

Figure 3:
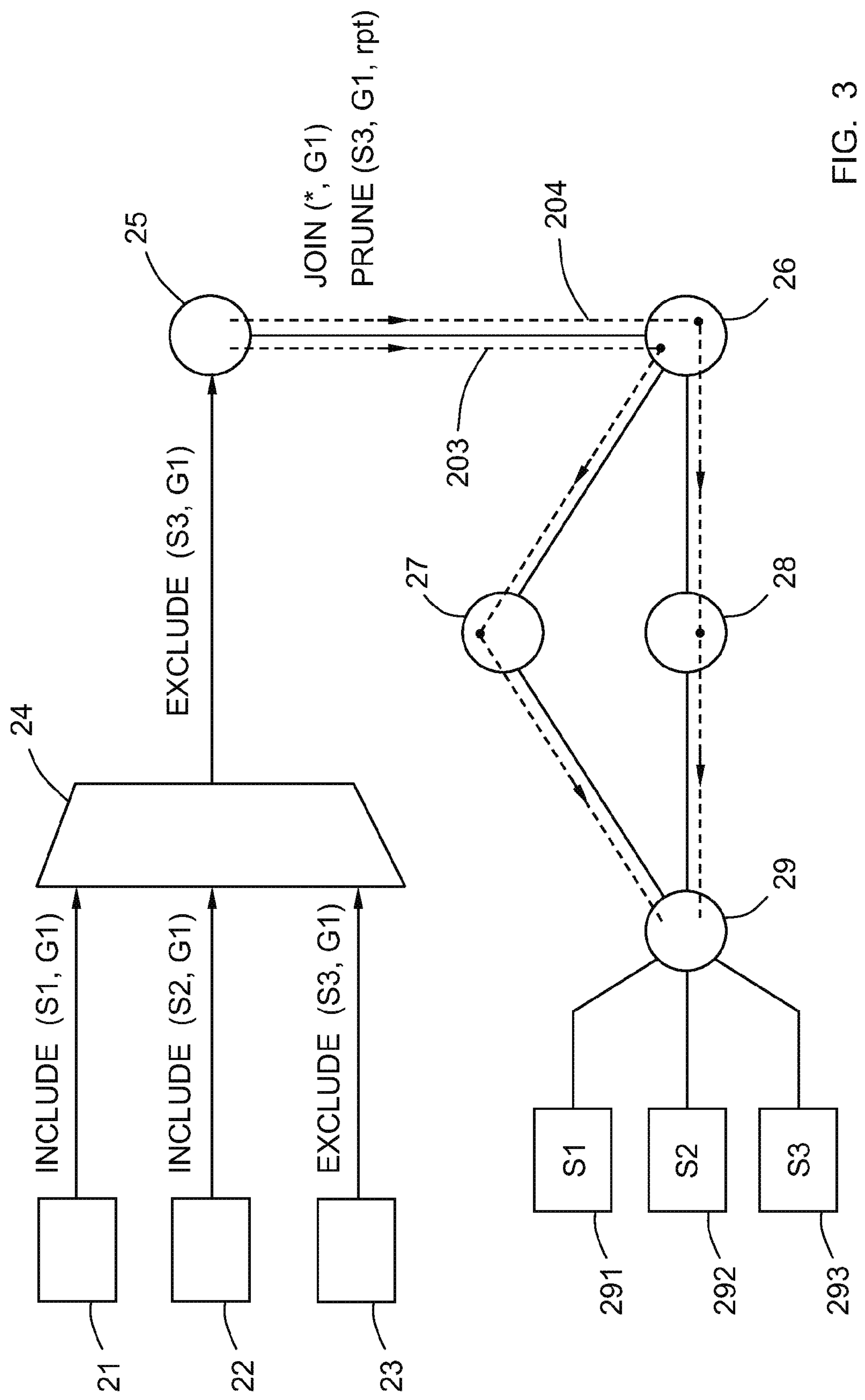
FIGS. 3 and 4 show two specific situations in the system of FIG. 2 according to the prior state of the art.

FIG. 3 illustrates a first situation in the system of FIG. 2 when the IGMPv3 protocol according to the prior state of the art is applied. Hosts 21, 22, 23 send to DSLAM 24 traffic requests with the following messages, respectively: INCLUDE(S1, G1), INCLUDE(S2, G1) and EXCLUDE(S3, G1). DSLAM 24 acts as an IGMP proxy and applies the rules of combining IGMP messages which were explained above, whereby sending to router 25 a single request with an EXCLUDE(S3, G1) message. Router 25 translates this request into two PIM-SM messages which it sends to the next router 26: a JOIN (*, G1) message to receive all the traffic from group G1 and a PRUNE (S3, G1, rpt) message for not receiving the traffic from group G1 coming from source S3. When the RP router 26 receives these messages, it updates its state records and transmits the messages to router 27, which in turn updates its state records and transmits the same messages to router 29, which also updates its state records. Since the router 29 is in direct communication with data sources S1, S2 and 53, multicast traffic is transmitted from router 29 to router 25 following the same way 203 the PIM-SM messages have followed but in the opposite direction.

Figure 4:
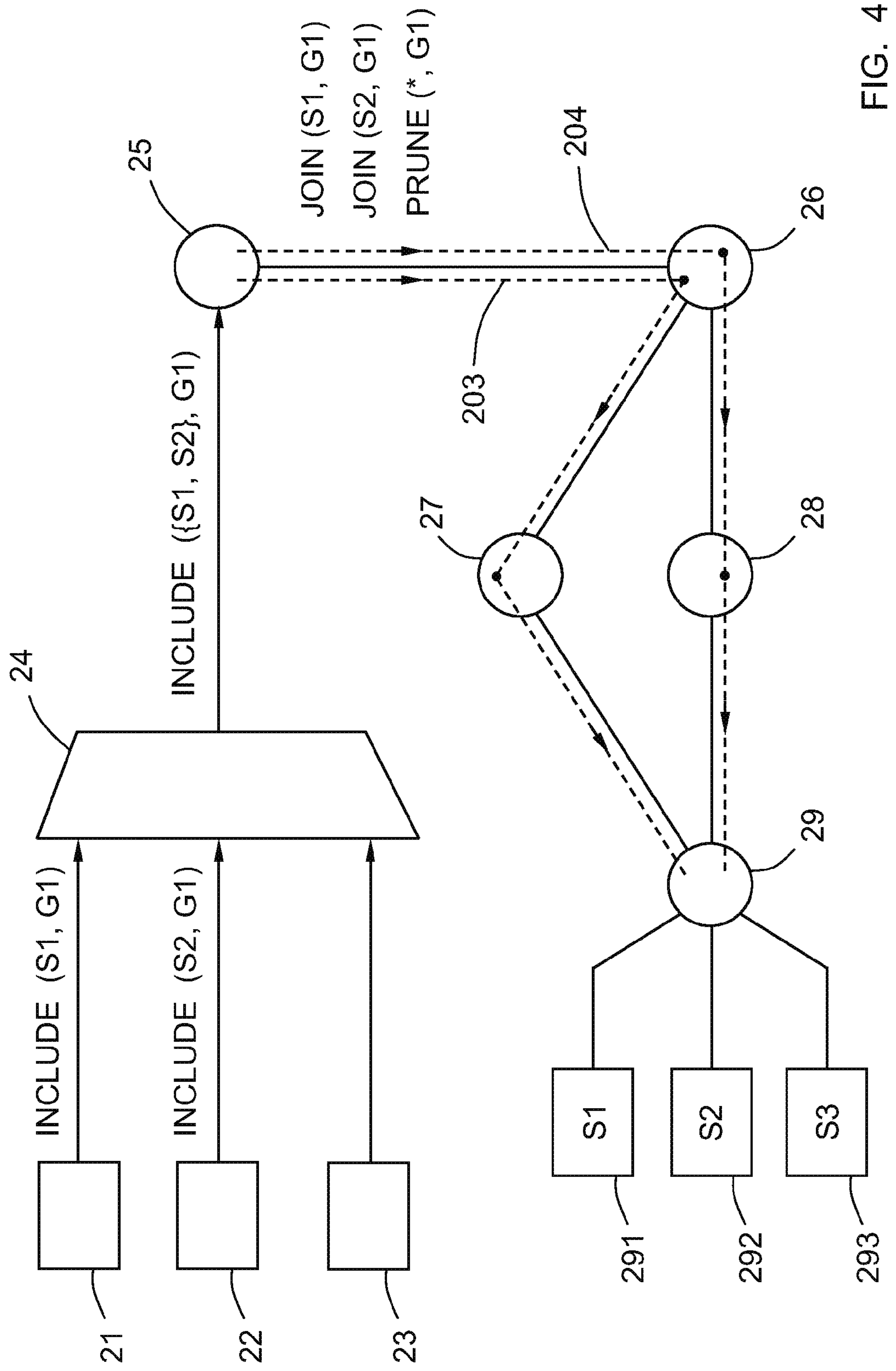

FIG. 4 illustrates a second situation which takes place after the first situation of FIG. 3. Host 23 stops sending the EXCLUDE(S3, G1) message, whereas hosts 21 and 22 continue to send the same INCLUDE(S1, G1) and INCLUDE (S2, G1) messages. DSLAM 24, acting as an IGMP proxy and applying the rules of combining IGMP messages which were explained above, sends to the router 25 a single request with an INCLUDE({S1, S2}, G1) message. Router 25 translates this request into three PIM-SM messages which it sends to the next router 26: two JOIN(S1, G1) and JOIN(S2,G1) messages to receive the traffic from channels (S1, G1) and (S2, G1) and a PRUNE(*, G1) message to stop receiving all the traffic from group G1. These PIM-SM messages are transmitted from router to router until router 29. As in the previous case, each router updates its corresponding state records when it receives PIM-SM messages. When router 29 has received the three messages, its state records have been updated: the state records associated to the JOIN(S1, G1) and JOIN(S2, G1) messages are in JOIN state, indicating that it must transmit the traffic from channels (S1, G1) and (S2, G1), and the state record associated to the PRUNE(*, G1) message is in PRUNE state, indicating that it must not transmit all the traffic from group G1. Router 29 therefore correctly transmits the multicast traffic that router 25 had requested. The same occurs in the intermediate routers. The PRUNE(*, G1) message must pass through RP router 27, and therefore follows path 203, whereas JOIN(S1, G1) and JOIN(S2, G1) messages can follow direct path 204 without passing through RP router 27, since they know source addresses S1 and S2.

In a system formed by routers using improved IGMP and PIM-SM protocols, it is possible for the PRUNE(*, G1) message to reach the router 29 before the JOIN(S1, G1) and JOIN(S2, G1) messages. If this occurs, until said JOIN messages arrive, router 29 will cut off traffic transmission (*, G1) of the entire multicast group G1 and will therefore also stop transmitting channels (S1, G1) and (S2, G1), whereby an unwanted interruption of traffic from these channels will have occurred.

This problem was concealed by the delay system in the two IGMP and PIM-SM protocols of the prior state of the art which delay the propagation of PRUNE messages. Since in addition to the delay of the IGMP protocol each PIM-SM router delays the transmission of a PRUNE message for 3 seconds, the PRUNE messages never arrived before the JOIN messages. However, if the intention is to eliminate these complicated delay systems in the IGMP and PIM-SM protocols, this new problem occurs.

The embodiment of the invention described below implements a modification of the IGMP protocol which allows a router or an IGMP proxy to not be obliged to combine traffic requests it receives referring to a single multicast group in a single INCLUDE type or EXCLUDE type IGMP message, as is currently required in the IGMPv3 protocol, but rather it can combine them in an INCLUDE type message and in an EXCLUDE type message and send both messages. As is shown in the following example, this particular operation of the routers and IGMP proxies eliminates the technical problem of the unwanted interruption of multicast traffic.

Figure 5:
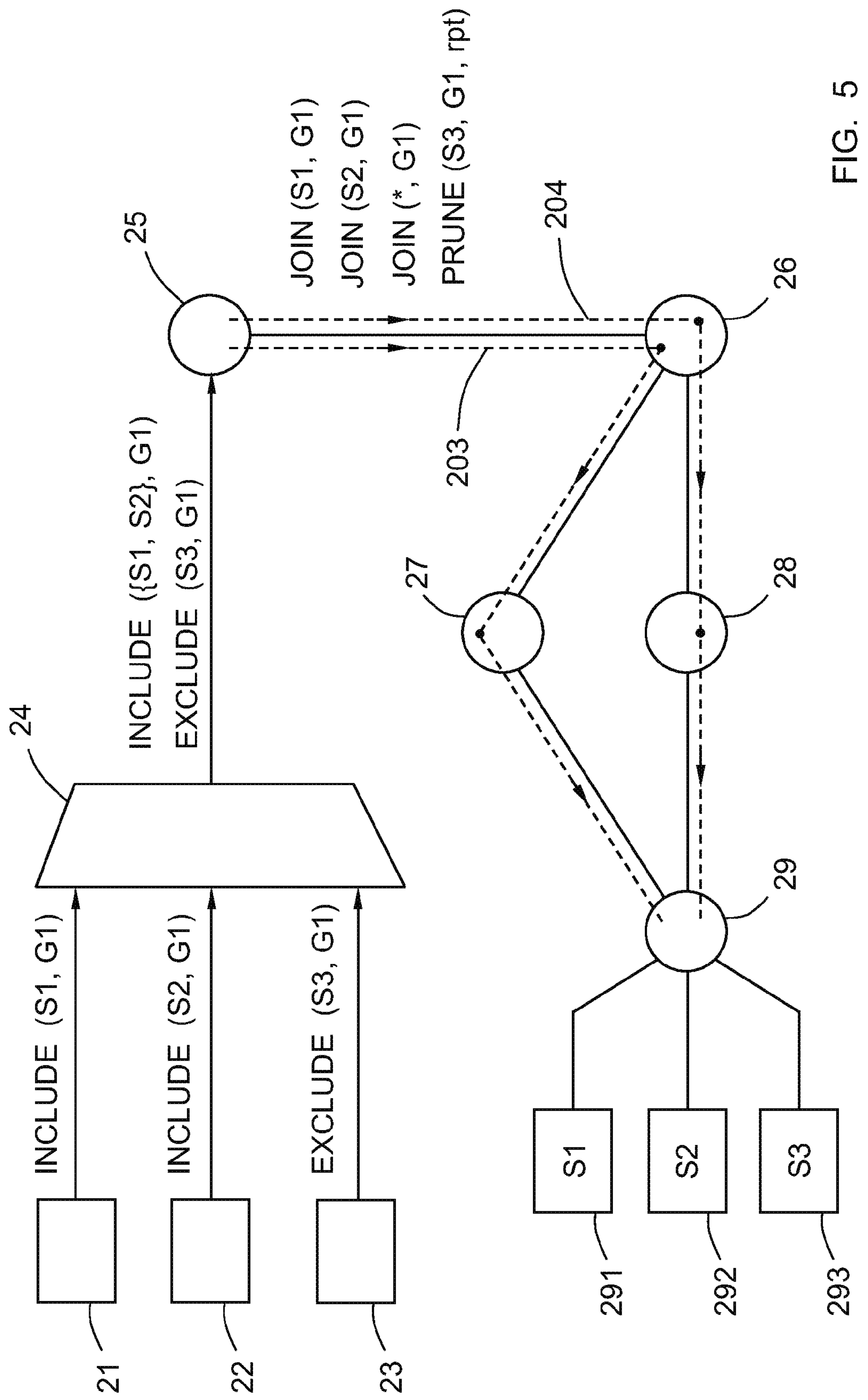
FIG. 5 shows a specific situation similar to that of FIG. 3, but according to an advantageous embodiment of the invention.

FIG. 5 shows the same situation as in FIG. 3, but in this case applying the improved IGMP protocol according to the present embodiment of the invention. DSLAM 24 receives the INCLUDE(S1, G1), INCLUDE(S2, G1) and EXCLUDE (S3, G1) messages and, instead of assembling them in a single EXCLUDE (S3, G1) message as required in the IGMPv3 protocol, it assembles them into an IGMP INCLUDE({S1, S2}, G1) message and an IGMP EXCLUDE(S3, G1) message. Router 25 receives these two INCLUDE({S1, S2}, G1) and EXCLUDE(S3, G1) messages, separately stores the information of the INCLUDE and EXCLUDE sources of group G1 and sends two JOIN(S1, G1) and JOIN(S2, G1) messages and two JOIN(*,G1) and PRUNE(S3, G1, rpt) messages. The difference with regard to the situation of FIG. 3 is that now router 25 is separately storing and managing IGMP requests with INCLUDE filter-mode and IGMP requests with EXCLUDE filter-mode, and sending the corresponding PIM-SM messages separately for each type of filter-mode.

When host 23 stops sending the EXCLUDE(S3. G1) message DSLAM 24 stops sending the EXCLUDE(S3, G1) message towards router 25 and only sends the INCLUDE({S1, S2}, G1) message. Router 25 will transmit the PRUNE(*,G1) message but the difference is that now router 29 can cut off traffic (*, G1) immediately after receiving the PRUNE(*, G1) message since traffic from multicast channels (S1,G1) and (S2,G1) continues to flow thanks to the PIM-SM JOIN(S1, G1) and JOIN(S2,G1) messages which have reached router 29 separately from the JOIN(*,G1) message.

For IGMP routers and IGMP proxies to be able to function in this manner, i.e. separately assembling the INCLUDE messages and the EXCLUDE messages and sending independent PIM-SM messages for each multicast group and filter-mode of the IGMP protocol, additional modifications to the IGMP protocol besides those explained in the first embodiment have been developed.

The modified IGMP protocol according to the invention differs from the previously explained protocol in that, in addition to performing an individual follow-up on the sources that each host of origin sending each message requests, the network interfaces can operate in dual mode: they can separately store and transmit the information of the sources contained in the IGMP INCLUDE type messages and the information of the sources contained in the IGMP EXCLUDE type messages.

To that end, the modified IGMP protocol saves two records: one for the EXCLUDE filter-mode and another one for the INCLUDE filter-mode for each network interface and multicast group. Therefore, an IGMP proxy or router using the modified IGMP protocol can save, for each network interface and multicast group, two separate records:

INCLUDE Record: (interface, multicast-address, hostID, group-timer, filter-mode=INCLUDE, {(source-address, source-timer)})

EXCLUDE Record: (interface, multicast-address, hostID, group-timer, filter-mode=EXCLUDE, {(source-address, source-timer)})

wherein interface indicates the network interface of the router through which the IGMP router has received the IGMP message;

multicast-address is the multicast group;

hostID is an identifier of the host that has sent the IGMP message.

{(source-address, source-timer)} is a list of elements (source-address, source-timer), where source-address is the source IP address and where source-timer is a timer associated with said source;

filter-mode can be INCLUDE or EXCLUDE and has the same operation as that described in RFC 3376: to indicate if the sources of the source list and timers are INCLUDE sources or EXCLUDE sources.

When the improved IGMP router or proxy has to decide if it must transmit a specific channel through a specific network interface, the algorithm of said router or proxy takes into account the different state records of the host referring to said multicast group and said network interface, hut with the different that now the hosts can have two state records with different INCLUDE and EXCLUDE filter-mode for a single multicast group. The algorithm applies the following rules:

For a specific network interface, a specific multicast group G, and a specific INCLUDE source S, as long as there is a state record of a host referring to said network interface and said multicast group G the filter-mode of which is INCLUDE and the source-timer of which associated with said INCLUDE source S is greater than zero, the improved IGMP router will transmit through said network interface the multicast traffic of channel (S,G).

Furthermore, if for said network interface and multicast group G there are state records the filter-mode of which is EXCLUDE, the improved GMP router will further transmit through said network interface the multicast traffic from all the sources except those of the set resulting from the intersection of all the Exclude Lists of said state records with EXCLUDE filter-mode for said network interface and multicast group G.

Table 4 (at the end of this document) shows the operation of an improved router applying the IGMP protocol modified according to the invention. In its initial state, the router has, for a specific network interface, a specific multicast group G and a specific host two state records for said multicast group G because it has INCLUDE sources as well as EXCLUDE sources.

As in Table 3, Table 4 relates to a specific network interface of the router, a specific multicast group and a specific host sending IGMP messages.

As can be seen in Table 4, the use of two separate records for storing the INCLUDE and EXCLUDE sources together with the individual follow-up of the traffic requests of each host allows eliminating the Requested-List which is no longer necessary. The EXCLUDE(Y) lists represent the Exclude List, and the EXCLUDE sources no longer need timers, simplifying their operation.

The Group-Timer or GT continues to be used to eliminate the EXCLUDE record when said timer reaches zero.

It can also be seen in Table 4 that four new IGMP messages have been defined. The first two ALLOWIN (B) and BLOCKIN (B) modify the sources of the INCLUDE record and the last two ALLOWEX (B) and BLOCKEX (B) modify the sources of the EXCLUDE record.

In the same manner, the IS_IN(B) message only affects the INCLUDE record and the IS_EX(B) message only affects the EXCLUDE record. This separation of messages affecting the INCLUDE and EXCLUDE records provides enormous simplicity. When comparing Table 4 with Table 1, it is obvious that Table 4 is much simpler than Table 1. In addition to having simplified the management of timers and having eliminated the sending of Group-And-Source-Specific Query messages, it has been achieved that the IGMP router only has to manage the six cases corresponding to the six rows of Table 4, instead of the twelve cases appearing in Table 1. The comparison between Tables 1 and 4 shows that the improved IGMP protocol considerably aids in implementing and programming the algorithms in the routers, as well as solving the aforementioned inefficiency problems.

In the example of FIG. 5, DSLAM 24 has applied these rules for assembling the INCLUDE(S1, G1), INCLUDE(S2, G1) and EXCLUDE(S3, S1) messages in an IGMP INCLUDE({S1, S2}, G1) message and another IGMP EXCLUDE(S3, G1) message.

For communications between a host and an IGMP router, the modified IGMP protocol uses the same messages as the IGMPv3 protocol, which are described in section 4 of RFC 3376. The only difference is in the internal format of the data blocks referred to as Group Record which are contained in each Membership Report message: in the modified IGMP protocol, when there are INCLUDE sources and also EXCLUDE sources for the same multicast group, two Group Records are included in the Membership Report message: one for INCLUDE sources and another one for EXCLUDE sources.

TABLE 1

(STATE OF THE ART): operation example of an IGMP router of the state of the art applying the IGMPv3 protocol.

| | STATE 1 | MESSAGE | STATE 2 | ACTIONS |
|---|---|---|---|---|
| 1. | INCLUDE (A) | IS_IN (B) | INCLUDE (A+B) | T(B)=GMI |
| 2. | INCLUDE (A) | IS_EX (B) | EXCLUDE (A*B,B−A) | T(B−A)=0<br>DEL (A−B)<br>GT=GMI |
| 3. | EXCLUDE (X,Y) | IS_IN (A) | EXCLUDE (X+A,Y−A) | T(A)=GMI |
| 4. | EXCLUDE (X,Y) | IS_EX (A) | EXCLUDE (A−Y,Y*A) | T(A−X−Y)=GMI<br>DEL (X−A)<br>DEL (Y−A)<br>GT=GMI |
| 5. | INCLUDE (A) | ALLOW (B) | INCLUDE (A+B) | T(B)=GMI |
| 6. | INCLUDE (A) | BLOCK (B) | INCLUDE (A) | SEND Q(G,A*B) |
| 7. | INCLUDE (A) | TO_EX (B) | EXCLUDE (A*B,B−A) | T(B−A)=0<br>DEL (A−B)<br>SEND Q(G,A*B)<br>GT=GMI |
| 8. | INCLUDE (A) | TO_IN (B) | INCLUDE (A+B) | T(B)=GMI<br>SEND Q(G,A−B) |
| 9. | EXCLUDE (X,Y) | ALLOW (A) | EXCLUDE (X+A,Y−A) | T(A)=GMI |
| 10. | EXCLUDE (X,Y) | BLOCK (A) | EXCLUDE (X+(A−Y),Y) | T(A−X−Y)=GT<br>SEND Q(G,A−Y) |
| 11. | EXCLUDE (X,Y) | TO_EX (A) | EXCLUDE (A−Y,Y*A) | T(A−X−Y)=GT<br>DEL (X−A)<br>DEL (Y−A)<br>SEND Q(G,A−Y)<br>GT=GMI |
| 12. | EXCLUDE (X,Y) | TO_IN (A) | EXCLUDE (X+A,Y−A) | T(A)=GMI<br>SEND Q(G,X−A)<br>SEND Q(G) |

TABLE 2

(STATE OF THE ART): operation example of an IGMP router of the state of the art applying the IGMPv3 protocol when a host successively switches channels.

| MESSAGE SENT BY THE HOST | SOURCES THE TRAFFIC OF WHICH THE ROUTER TRANSMITS | ACTIONS PERFORMED BY THE ROUTER |
|---|---|---|
| INCLUDE(S1) | S1 | T(S1)=GMI |
| ALLOW(S2) | S1, S2 | T(S2)=GMI |
| BLOCK(S1) | S1, S2 | T(S1)=LMQT; SEND Q(G, S1) |
| ALLOW(S3) | S1, S2, S3 | T(S3)=GMI |
| BLOCK(S2) | S1, S2, S3 | T(S2)=LMQT; SEND Q(G, S2) |

TABLE 3 operation example of an improved IGMP router according to a first embodiment of the invention.

| | STATE 1 | MESSAGE | STATE 2 | ACTIONS |
|---|---|---|---|---|
| 1. | INCLUDE (A) | IS_IN (B) | INCLUDE (B) | T(B)=GMI<br>DEL(A−B) |
| 2. | INCLUDE (A) | IS_EX (B) | EXCLUDE ({ },B) | T(B)=0<br>DEL(A−B)<br>GT=GMI |
| 3. | EXCLUDE (X,Y) | IS_IN (A) | INCLUDE (A) | T(A)=GMI<br>DEL(X+Y)−A |
| 4. | EXCLUDE (X,Y) | IS_EX (A) | EXCLUDE ({ },A) | T(A)=0<br>DEL(X+Y)−A<br>GT=GMI |
| 5. | INCLUDE (A) | ALLOW (B) | INCLUDE (A+B) | T(B)=GMI |
| 6. | INCLUDE (A) | BLOCK (B) | INCLUDE (A−B) | DEL(B) |
| 7. | INCLUDE (A) | TO_EX (B) | EXCLUDE ({ },B) | T(B)=0<br>DEL(A−B)<br>GT=GMI |
| 8. | INCLUDE (A) | TO_IN (B) | INCLUDE (B) | T(B)=GMI<br>DEL(A−B) |

TABLE 3-continued operation example of an improved IGMP router according to a first embodiment of the invention.

| | STATE 1 | MESSAGE | STATE 2 | ACTIONS |
|---|---|---|---|---|
| 9. | EXCLUDE (X,Y) | ALLOW (A) | EXCLUDE (X+A,Y−A) | T(A)=GMI |
| 10. | EXCLUDE (X,Y) | BLOCK (A) | EXCLUDE (X−A,Y+A) | T(A)=0 |
| 11. | EXCLUDE (X,Y) | TO_EX (A) | EXCLUDE ({ },A) | T(A)=0<br>DEL(X+Y)−A<br>GT=GMI |
| 12. | EXCLUDE (X,Y) | TO_IN (A) | INCLUDE (A) | T(A)=GMI<br>DEL(X+Y)−A |

TABLE 4 operation example of an improved IGMP router according to a second embodiment of the invention.

| | STATE 1 | MESSAGE | STATE 2 | ACTIONS |
|---|---|---|---|---|
| 1. | INCLUDE (A)<br>EXCLUDE (Y) | IS_IN (B) | INCLUDE (B)<br>EXCLUDE (Y) | T(B)=GMI<br>DEL(A−B) |
| 2. | INCLUDE (A)<br>EXCLUDE (Y) | IS_EX (B) | INCLUDE (A)<br>EXCLUDE (B) | DEL(Y−B)<br>GT = GMI |
| 3. | INCLUDE (A)<br>EXCLUDE (Y) | ALLOWIN (B) | INCLUDE (A+B)<br>EXCLUDE (Y) | T(B)=GMI |
| 4. | INCLUDE (A)<br>EXCLUDE (Y) | BLOCKIN (B) | INCLUDE (A−B)<br>EXCLUDE (Y) | DEL(B) |
| 5. | INCLUDE (A)<br>EXCLUDE (Y) | ALLOWEX (B) | INCLUDE (A)<br>EXCLUDE (Y−B) | DEL(B) |
| 6. | INCLUDE (A)<br>EXCLUDE (Y) | BLOCKEX (B) | INCLUDE (A)<br>EXCLUDE (Y+B) | |

The invention claimed is:

1. A method for transmitting multicast data packets from a multicast snooping switch, the method comprising:

a. the multicast snooping switch receiving, via one or more ports, multicast data requests made by a host;

b. the multicast snooping switch reading information data contained in the multicast data requests;

c. the multicast snooping switch storing state data based on the information data contained in the multicast data requests for a first port, a first multicast group address, and the host requesting multicast data of the first multicast group address from the first port, the state data comprising:

i. an INCLUDE state record, the INCLUDE state record comprising identifying data of the first port, identifying data of the first multicast group, identifying data of the host, a source list comprising source IP addresses and a source-timer associated with each source IP address, and an INCLUDE filter mode designator; or ii. an EXCLUDE state record, the EXCLUDE state record comprising identifying data of the first port, identifying data of the first multicast group address, identifying data of the host, a source list comprising a requested list having source IP addresses with an associated source-timer having a value greater than zero and an exclude list comprising source IP addresses with an associated source-timer of value zero, and an EXCLUDE filter mode designator;

d. the multicast snooping switch storing one or more of the INCLUDE state records for the first port and the first multicast group address; and e. the multicast snooping switch transmitting through the first port, at least the multicast data packets which have as a destination IP address the first multicast group address and which have as a source IP address any source IP address from the union of all the source lists stored in the INCLUDE state records of the first port and the first multicast group address and having a source-timer greater than zero.

2. The method of claim 1, further comprising:

a. the multicast snooping switch storing one or more EXCLUDE state records for the first port and the first multicast group address; and b. the multicast snooping switch transmitting, through the first port, multicast data packets which have as a destination IP address the first multicast group address and which have as a source IP address any source IP address except the sources from the intersection of all the exclude lists stored in the EXCLUDE state records of the first port and the first multicast group address.

3. The method of claim 2, wherein the multicast data requests are based on the IGMPv3 (Internet Group Management Protocol Version 3) protocol or a version or modification thereof.

4. The method of claim 2, wherein the multicast data requests are based on the MLDv2 (Multicast Listener Discovery protocol Version 2) or a version or modification thereof.

5. The method of claim 2, wherein the multicast snooping switch receives the multicast data requests in IP packets sent from the host and the multicast snooping switch uses the source IP address of the received IP packets as the identifying data of the host requesting multicast data.

6. The method of claim 2, wherein the multicast snooping switch receives the multicast data requests in IP packets sent from the host that are carried by data frames and the multicast snooping switch uses the source MAC (Media Access Control) address of the data frames that carry the received IP packets as the identifying data of the host requesting multicast data.

7. The method of claim 2, wherein the multicast snooping switch receives the multicast data requests in IP packets sent from the host that are carried by data frames and the multicast snooping switch uses the source MAC (Media Access Control) address of the data frames that carry the received IP packets and the source IP address of the received IP packets as the identifying data of the host requesting multicast data.

8. The method of claim 2, further comprising:

a. the multicast snooping switch analyzing information stored in the state records of the host; and b. based on the analyzed information, the multicast snooping switch limiting the amount of multicast data the multicast snooping switch transmits to the host.

9. The method of claim 2, wherein the requested list is an empty list for at least one of the EXCLUDE state records.

10. The method of claim 2, wherein the exclude list is an empty list for at least one of the EXCLUDE state records.

11. The method of claim 2, further comprising:

a. the multicast snooping switch analyzing information stored in the INCLUDE state records and the EXCLUDE state records; and b. based on the analyzed information, the multicast snooping switch adjusting the multicast bandwidth which the multicast snooping switch has available for distributing among various hosts.

12. The method of claim 2, further comprising:

a. the multicast snooping switch analyzing the information stored in the state records of a single host; and b. based on the analyzed information, the multicast snooping switch limiting the amount of multicast data the single host can request.

13. A method for storing and updating state records usable to transmit multicast packets in a multicast snooping switch, the method comprising:

a. the multicast snooping switch storing for a combination of a first port, a first multicast group address and a first host:

i. a first INCLUDE state record, comprising identifying data of the first port through which the multicast snooping switch has received a specific multicast data request, identifying data of the first multicast group address from which the multicast data has been requested, identifying data of the first host from which the multicast data request has been received, a source list comprising source IP addresses and a source-timer associated with each source IP address, and an INCLUDE filter mode designator; or ii. a first EXCLUDE state record, comprising identifying data of the first port through which the multicast snooping switch has received a specific multicast data request, identifying data of the first multicast group address from which the multicast data has been requested, identifying data of the first host from which the multicast data request has been received, a source list comprising a requested list having source IP addresses with an associated source-timer having a value greater than zero and an exclude list comprising source IP addresses with an associated source-timer of value zero, and an EXCLUDE filter mode designator;

b. the multicast snooping switch receiving from the first host, via the first port, a routing message using a multicast routing protocol, the routing message comprising identifying data of the first multicast group address;

c. the multicast snooping switch reading information data contained in the routing message; and d. the multicast snooping switch replacing, based on the information data, the first state record for the combination of the first port, the first multicast group address and the first host with a second state record without modifying the state records of other hosts for the same first port and first multicast group address.

14. The method of claim 13, wherein the routing message is based on the IGMPv3 (Internet Group Management Protocol Version 3) protocol or a version or modification thereof.

15. The method of claim 13, wherein the routing message is based on the MLDv2 (Multicast Listener Discovery protocol Version 2) or a version or modification thereof.

16. The method of claim 13, wherein:

a. the first state record comprises an INCLUDE(A) state record where (A) comprises a first source list;

b. the routing message comprises an IS$_{13}$INCLUDE(B) type message, where (B) comprises a second source list; and c. the second state record comprises an INCLUDE(B) state record, where (B) comprises the second source list.

17. The method of claim 13, wherein:

a. the first state record comprises an INCLUDE(A) state record where (A) comprises a first source list;

b. the routing message comprises an IS$_{13}$EXCLUDE(B) type message, where (B) comprises a second source list; and c. the second state record comprises an EXCLUDE ({ }, B) state record having an empty requested list and an exclude list comprising the second source list (B).

18. The method of claim 13, wherein:

a. the first state record comprises an EXCLUDE (X,Y) state record where (X) is the requested list and (Y) is the exclude list;

b. the routing message comprises an IS$_{13}$INCLUDE(A) type message, where (A) comprises a third source list; and c. the second state record comprises an INCLUDE(A) state record, where (A) comprises the third source list.

19. The method of claim 13, wherein:

a. the first state record comprises an EXCLUDE (X,Y) state record where (X) is the requested list and (Y) is the exclude list;

b. the routing message comprises an IS$_{13}$EXCLUDE(A) type message, where (A) is a third source list; and c. the second state record comprises an EXCLUDE ({ }, A) state record having an empty requested list and an exclude list comprising the third source list (A).

20. The method of claim 13, wherein:

a. the first state record comprises an INCLUDE(A) state record where (A) comprises a first source list;

b. the routing message comprises an ALLOW(B) type message, where (B) comprises a second source list; and c. the second state record comprises an INCLUDE(A+B) state record, where (A+B) is the union of the set of sources of the fist source list (A) and the second source list (B).

21. The method of claim 13, wherein:

a. the first state record comprises an INCLUDE(A) state record where (A) comprises a first source list;

b. the routing message comprises a BLOCK(B) type message, where (B) comprises a second source list; and c. the second state record comprises an INCLUDE(A−B) state record comprising the set of sources in the list of sources (A) minus the sources of the list of sources (A) that are also in the list of sources (B).

22. The method of claim 13, wherein:

a. the first state record comprises an INCLUDE(A) state record where (A) comprises a first source list;

b. the routing message comprises a TO$_{13}$EXCLUDE(B) type message, where (B) comprises a second source list; and c. the second state record comprises an EXCLUDE ({ }, B) state record having an empty requested list and an exclude list comprising the second source list (B).

23. The method of claim 13, wherein:

a. the first state record comprises an INCLUDE(A) state record where (A) comprises a first source list;

b. the routing message comprises a TO$_{13}$INCLUDE(B) type message, where (B) comprises a second source list; and c. the second state record comprises an INCLUDE(B) state record, where (B) comprises the second source list.

24. The method of claim 13, wherein:

a. the first state record comprises an EXCLUDE (X,Y) state record where (X) is the requested list and (Y) is the exclude list;

b. the routing message comprises an ALLOW(A) type message, where (A) is a third source list; and c. the second state record comprises an EXCLUDE (X+A, Y−A) state record having a requested list (X+A) comprising the union of the set of sources of the source list (X) and the source list (A) and an exclude list (Y−A) comprising the set of sources in the list of sources (Y) minus the sources of the list of sources (Y) that are also in the list of sources (A).

25. The method of claim 13, wherein:

a. the first state record comprises an EXCLUDE (X,Y) state record where (X) is the requested list and (Y) is the exclude list;

b. the routing message comprises a BLOCK(A) type message, where (A) is a third source list; and c. the second state record comprises an EXCLUDE (X−A, Y+A) state record having a requested list (X−A) comprising the set of sources in the list of sources (X) minus the sources of the list of sources (X) that are also in the list of sources (A) and an exclude list (Y+A) comprising the union of the set of sources of the source list (Y) and the source list (A).

26. The method of claim 13, wherein:

a. the first state record comprises an EXCLUDE (X,Y) state record where (X) is the requested list and (Y) is the exclude list;

b. the routing message comprises an TO$_{13}$EXCLUDE(A) type message, where (A) is a third source list; and c. the second state record comprises an EXCLUDE ({ }, A) state record having an empty requested list and an exclude list comprising the third source list (A).

27. The method of claim 13, wherein:

a. the first state record comprises an EXCLUDE (X,Y) state record where (X) is the requested list and (Y) is the exclude list;

b. the routing message comprises an TO$_{13}$INCLUDE(A) type message, where (A) comprises a third source list; and c. the second state record comprises an INCLUDE(A) state record, where (A) comprises the third source list.

* * * * *